Oct. 23, 1923. F. E. WEST 1,471,433
CAMPING OUTFIT
Filed Oct. 26, 1921 4 Sheets-Sheet 4
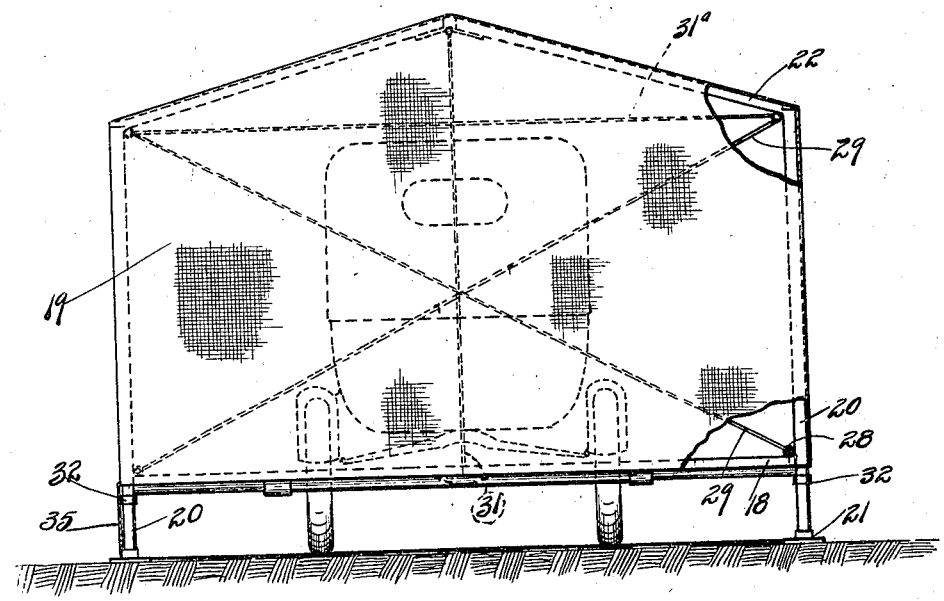
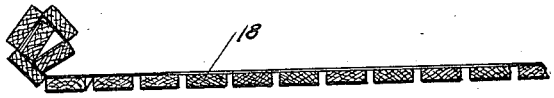
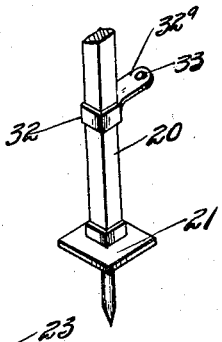
INVENTOR.
*Francis E. West.*
BY
*Frank C. Fearman*
ATTORNEY.

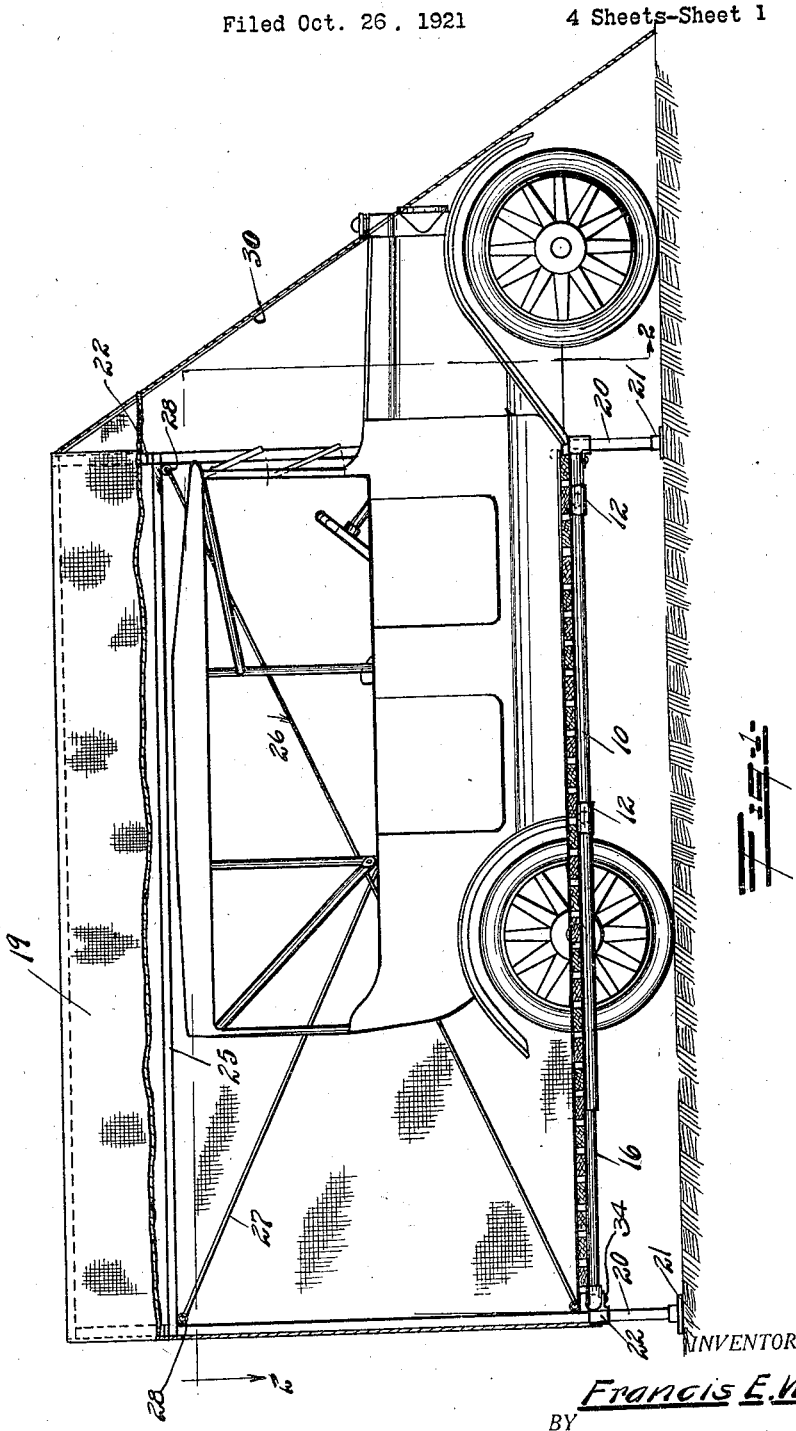

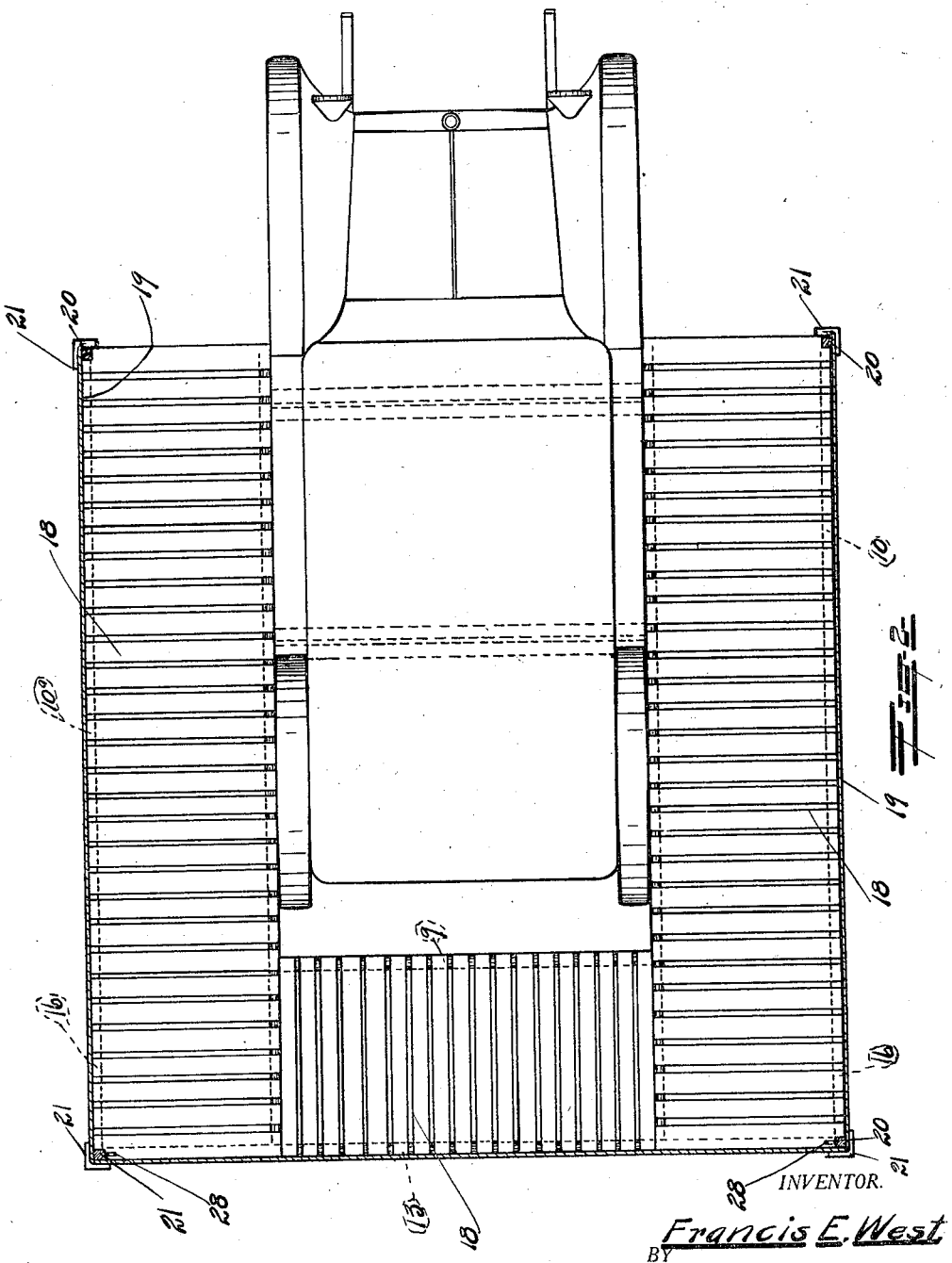

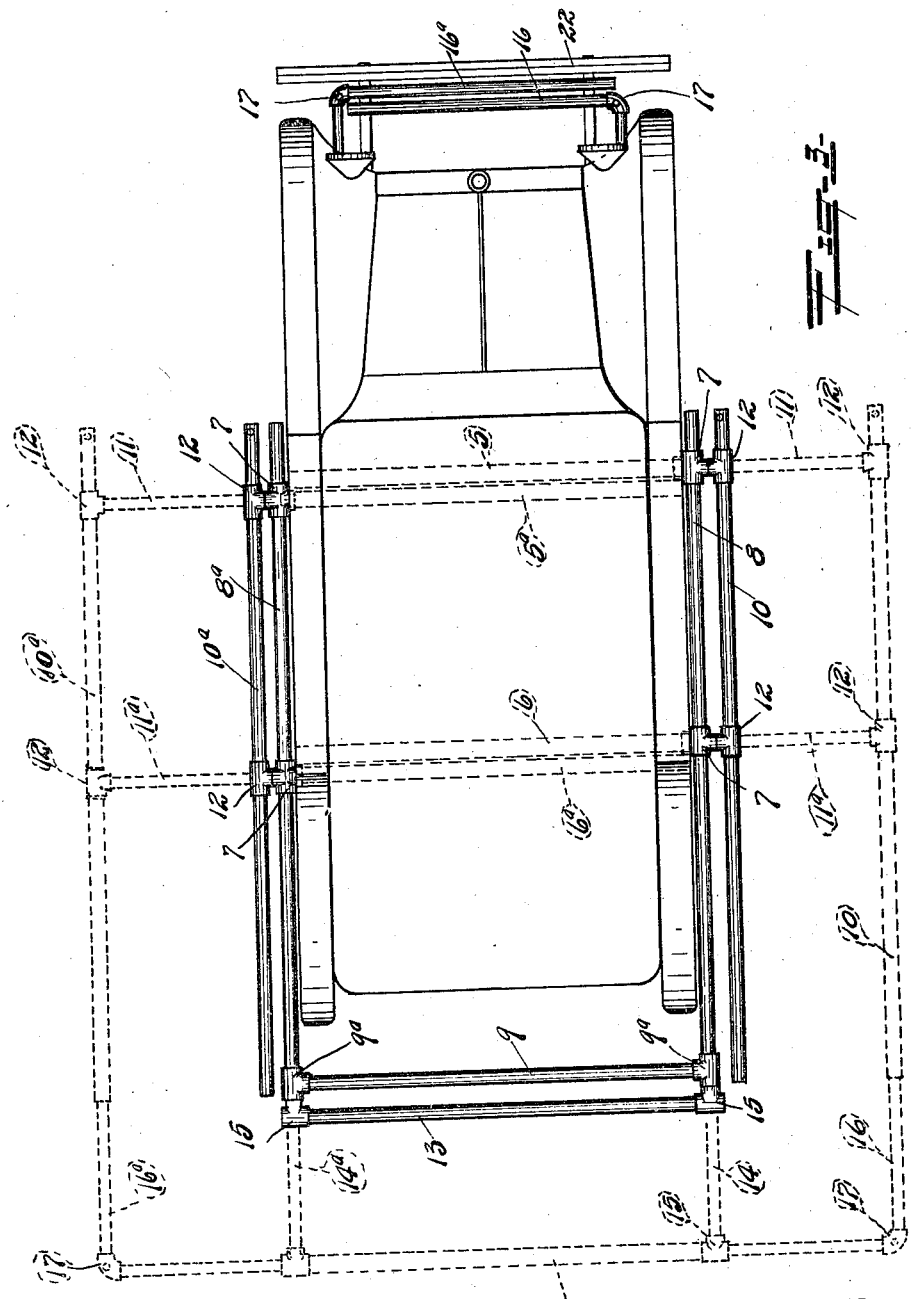

Patented Oct. 23, 1923.

1,471,433

UNITED STATES PATENT OFFICE.

FRANCIS E. WEST, OF ALMA, MICHIGAN.

CAMPING OUTFIT.

Application filed October 26, 1921. Serial No. 510,572.

*To all whom it may concern:*

Be it known that I, FRANCIS E. WEST, a citizen of the United States of America, and a resident of Alma, in the county of Gratiot and State of Michigan, have invented certain new and useful Improvements in Camping Outfits, of which the following is a specification.

This invention relates to camping outfits and the like.

One object of the invention is to design a simple and practical compact camping outfit adapted to be readily attached to and be detached from an automobile and capable of being quickly and easily arranged for use.

Another object of the invention is to provide a camping outfit which will serve as a garage for the automobile to which it is attached, as well as a complete camping outfit for the occupants of the automobile.

A still further object is to provide a camping outfit of rigid construction having a floor which is supported and spaced from the ground, so that snakes and other common pests such as mosquitoes and flies cannot enter, and to protect the occupants from the dampness in wet weather, which is impossible with camping outfits which are not provided with floors.

A further object of the invention is to make the running board and frame of the automobile more rigid and solid when the camping outfit is closed and the automobile is on the road, and to eliminate the expense of purchasing extra supporting devices for the running board to prevent sagging as is usually necessary at present.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction, without departing from the spirit or sacrificing any of the advantages of the invention.

In the drawings:—

Fig. 1 is a side view of my improved camping outfit arranged for use, one wall being broken away to show the interior.

Fig. 2 is a sectional plan view taken on the line 2—2 of Fig. 1.

Fig. 3 is a top plan view of the telescoping frame, the full lines illustrating it in closed position for travel, and the dotted lines illustrating it extended preparatory to camping.

Fig. 4 is a rear view, sections being broken away to illustrate the bracing.

Fig. 5 is a fragmentary sectional view of the floor illustrating how it is rolled for packing.

Fig. 6 is a detail view of one pair of rafter supports illustrating them in folded position, and Fig. 7 is an isometric view illustrating the means of securing the corners of the telescoping frame to the tent corner supports.

Referring now particularly to the drawings in which I have shown the preferred embodiment of my invention, the camping outfit comprises a telescoping sliding frame attached to the automobile in any approved manner, and which can be extended as clearly shown in Fig. 3 of the drawings, this frame together with suitable corner braces, supports the tent and removable floor when camping, and when traveling is adapted to assume the position shown in full lines, portions thereof forming front and rear auxiliary bumpers, the frame also serving to strengthen the frame and body of the automobile.

In the construction shown I have provided the sections of transversely extending pipes or tubing 5 and $5^a$, and 6 and $6^a$ which I securely attach to the underside of the automobile in any approved manner, one end of each respective section having a fitting or commercially named cross 7 secured thereto. longitudinally extending sections 8 and $8^a$ extend through these crosses, said sections being connected together at the rear by means of a tube 9 secured to T fittings $9^a$, this member 9 forming a permanent bumper for the machine, and is loose in the T so that it can be easily removed, making it possible to remove the tire. Similar longitudinally extending members 10 and $10^a$ are located adjacent the members 8 and $8^a$ and these are provided with laterally extending sections 11 and $11^a$ connected to the main members 10 and $10^a$ by means of T fittings 12 and are adapted to telescope into the sections 5, $5^a$, 6 and $6^a$, so that when the machine is traveling these members 10 and $10^a$ will be in the position shown in full lines, and when it is desired to camp, they will be extended to the position shown in dotted lines.

The rear extension is formed in a substantially similar manner, the member 13 having a pair of laterally extending sections 14 and 14a secured thereto by means of T's 15 adapted when traveling to be in position shown in full lines and when camping this section is pulled outwardly and assumes the position as shown in dotted lines. The rear corners 16 and 16a are formed of similar material secured together by means of the elbows 17 and when traveling these sections are carried in suitable holders (not shown) provided in front of the machine and act as a front bumper.

A flexible removable floor 18 is provided and is supported on these several sections when the camping outfit is assembled, this is preferably formed of a series of slats secured together so that it can be rolled into bundles and carried on the running board when travelling, and I wish to direct attention to the fact that these outer sections comprising the extendable frame can be used as extensions to the running board for carrying luggage if desired. This flexible floor can be used on both sides and the end or any part thereof, and when used at the end only, this end portion can be used as a kitchen or sitting room the floor on the other two sides being removed and a canvas can be attached to the members 8 and 8a and 10 and 10a and providing a bed and being in the form of a stretcher, the canvas will be made taut when the members 8 and 8a and 10 and 10a are extended. This will provide two good beds, and will save the carrying of the extra slat floor for these two sides.

The entire machine, and the extended sections of the frame are adapted to be covered by a tent 19 when the outfit is assembled, and arranged for use, and this tent is supported by means of the corner supports 20 which are positioned at each corner of the frame, one end of each support being provided with an adjustable prong 21 adapted to be anchored in the earth, the opposite end extending up and engaging one end of a rafter 22 by means of which the top of the tent is supported, these rafters comprise two bars or members hingedly connected together at the point 23, the hinged ends of the bars being spaced apart to receive the ridge pole between them, the free end of the members being provided with a hinge member (not shown) adapted to be connected to the longitudinal members 25 by means of a hook and eye (not shown) to facilitate quick detachment and erection, cable or rope braces 26 and 27 are provided at opposite sides of the tent and are adapted to be anchored to eye-bolts 28 secured to the corner supports, similar braces 29 are provided at the rear end, and the front end is braced by means of a rope 30 secured to the forward end of the ridge pole and anchored to the radiator cap of the automobile. A vertically extending rope or cable brace 31 is also provided to prevent the members 22 from going up and pulling the top of the tent together, while chains or cables 31a prevent the tent from spreading, one end of this brace being anchored to an eye-bolt secured to the ridge pole, and the opposite end can be anchored to the floor, or frame, suitable means such as pulleys and rope tightener or the like can also be provided for tensioning the said braces, thus making it possible to keep the tent upright and rigid without the use of tent stakes as is the custom with ordinary tents.

The corners of the frame are further supported by means of a fitting 32 secured to the corner supports intermediate their length, and are provided with an outwardly extending lip 32a in which the opening 33 is formed, a similar opening is formed in each corner of the extendable frame, a bolt 34 being inserted therein, and it will be obvious that when it is desired to use the tent separately, these bolts can be removed together with the brace 30, the frame telescoping and the automobile driven away.

The tent is then clear for any desired use, the front end of the tent covers the hood and wheels in front, thus giving complete protection to the car. The fact that the frame extends from the rear and both sides of the automobile makes it unnecessary to leave the tent to pass from one side to the other of the machine in wet and stormy weather, as the rear end provides plenty of space to pass without passing through the automobile, the floor is also always dry and cool as the air can freely circulate through it and perfect ventilation is afforded. At night a bed can be used over the top of the seats, this together with other beds or the floor space provided by the extensions provides cool, well ventilated accommodations for a number of people, while in the daytime ample space is provided for cooking and eating. Screened windows (not shown) are also provided in the sides and ends.

The outfit does not in any manner alter or mar the appearance of the automobile to which it is attached, neither is it necessary to change or remodel the machine to which it is attached. It further provides strong and durable bumpers, the tent corner supports together with the rear corner frames forming the front bumpers, and are held in suitable holders provided therefor while on the road, the rear bumper being permanent, the ridge pole and rafters can be secured in under the machine while traveling and it will be apparent that it is not necessary to remove the luggage from the machine when setting up. Another important feature is that an oiled ground cloth can be spread and the auto is driven onto this and it is then fastened to the side walls of the tent by buttons so that it can be quickly attached. This when attached makes a mosquito and fly proof camp.

It will also be obvious that the tent can be used without any or few poles or rafters, and for those who do not desire a tent high enough to enable them to stand upright on all sides, the poles may be eliminated and the tent can rest on the top of the automobile. This, with the stretched canvas beds before mentioned would make it possible to have two good beds on the sides of the car, and by using the floor behind only, would save the transporting of the extra poles and rafters and a part of the floor.

From the foregoing description it will be obvious that I have perfected a very inexpensive and practical camping outfit having ample and satisfactory accommodations for the occupants of the automobile, and which also serves as a garage to protect the machine from the weather, it also provides a front and rear bumper running board much more rigid.

What I claim is:—

1. A camping outfit including a collapsible frame adapted to be mounted on an automobile or other vehicle, a sectional floor adapted to be laid thereon, means whereby the frame may be extended to receive said floor when arranged for use, and means for collapsing said frame to form bumpers, and extensions to the running board respectively when traveling on the road.

2. A camping outfit including a collapsible frame adapted to be mounted on an automobile or other vehicle, and spaced from the ground, means for extending the sides and rear of said frame, and detachable corner members for connecting the corners thereof when the outfit is arranged for use.

3. A camping outfit including a collapsible frame adapted to be mounted on an automobile or other vehicle, and spaced from the ground, means for extending the sides and rear of said frame, corner members for connecting the corners thereof, and a foldable removable floor adapted to be laid thereon.

4. In combination, a camping outfit including a collapsible frame adapted to be slidably mounted on an automobile and comprising end and side members adapted to be secured to and extended from the machine when the outfit is arranged for use, separate corner members for connecting the corners thereof, tent and frame supports secured to the frame corners, a tent covering therefor and a foldable floor adapted to be laid on said extended frame when the outfit is arranged for use.

5. In combination, a camping outfit including a collapsible frame adapted to be secured to an automobile, said frame being spaced from the ground and comprising extendable sides and end members, separate corner members for connecting said end and side members and a foldable floor adapted to cover the extended frame, corner supports for the frame, a tent covering supported thereby and means for bracing the top and sides of said tent.

In testimony whereof, I affix my signature.

FRANCIS E. WEST.